July 25, 1933.  A. W. PARSONS  1,919,903

HAND TRUCK

Filed June 4, 1930

INVENTOR
Arthur W. Parsons
BY
Robert W. Byerly
ATTORNEY

Patented July 25, 1933

1,919,903

UNITED STATES PATENT OFFICE

ARTHUR W. PARSONS, OF SAVANNAH, GEORGIA

HAND TRUCK

Application filed June 4, 1930. Serial No. 459,127.

This invention relates to hand trucks of the type commonly used by stevedores, and aims to provide means whereby the passage of such a truck over obstructions in its path is facilitated.

The ordinary hand truck now in use is provided with a pair of wheels near its front end. Such a truck must be manually lifted or pulled up over obstructions in its path with a consequent limitation on the load which may be carried. To overcome this disadvantage, I have invented means consisting of inexpensive standard parts which may be attached to the ordinary hand trucks in common use whereby the wheels of such a truck may be swung over obstructions.

An illustrative example of the means by which I have accomplished this result will be given in connection with a detailed description of a hand truck embodying this and other features of my invention and illustrated in the accompanying drawing in which.

Figure 1:
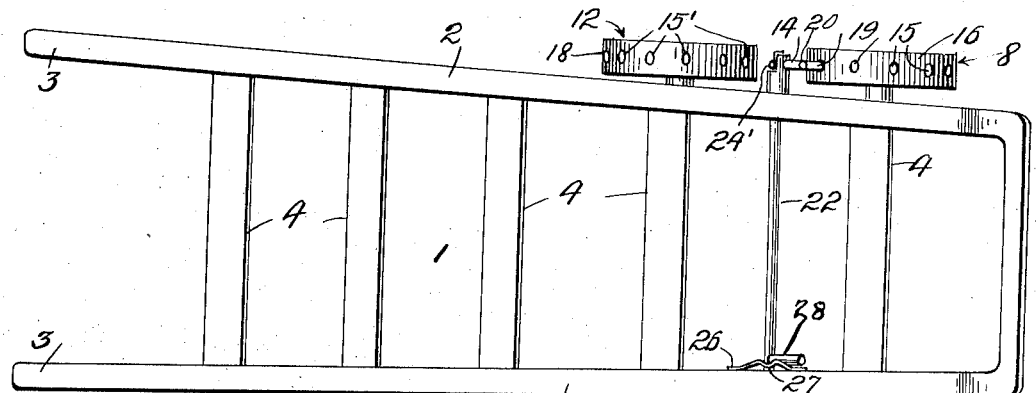
Fig. 1 is a plan view of my improved truck.

The truck illustrated has a frame 1 constructed in the usual manner and having side rails 2 terminating in handles 3 at their rear ends and connected by intermediate cross bars 4. Vertical hangers 5 depend from side rails 2 near the front end of the frame. Wheels 8 are mounted on axle 7 which is journalled in hangers 5. Fixed to side rails 2 near the rear end of the frame are downwardly extending rests 9. Hangers 10 are attached to side rails 2 at a point between rests 9 and wheels 8. Wheels 12 are mounted on axle 11 which is journalled in hangers 10.

Wheels 12 are so attached to the frame that they project below plane 17, tangent to wheels 8 at their lowermost points and touching the lower ends of rests 9. In the preferred form of my invention, I have attained this result by providing hangers 10 of a length equal to the length of hangers 5 whereby axle 11 and axle 7 are, respectively, an equal distance from frame 1. Wheels 12 are of the same circumference as wheels 8 and the length of rests 9 is less than the distance between the bottom of frame 1 and the lowermost point on the circumference of the wheels. Wheels 12 are spaced behind, but close to, wheels 8.

Figure 2:
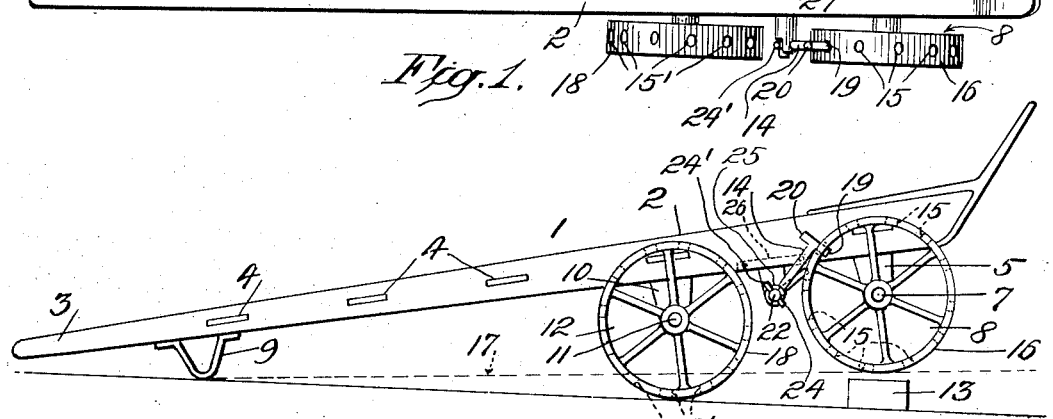
Fig. 2 is a side view showing the manner in which the front wheels may be swung over an obstruction.

In the normal transportation of goods by means of my improved truck, the truck is rolled on wheels 8, and wheels 12 are not in contact with the floor (Fig. 1). When an obstruction 13 is encountered, handles 3 are lowered until wheels 12 are brought into contact with the floor. When handles 3 are lowered further, wheels 12 serve, in effect, as the fulcrum of a lever of the first or second class about which the truck is easily swung, and wheels 8 are lifted as handles 3 are lowered. When wheels 8 have been lifted sufficiently to clear obstruction 13 (Fig. 2), the truck is rolled forward on wheels 12 until wheels 8 have passed said obstruction. The truck may then be returned to its normal operating position having passed over said obstruction without jolt or jar.

The rims 16 of wheels 8 are provided with holes 15, and rims 18 of wheels 12 are provided with holes 15'. Locking means consisting of substantially T-shaped latches 14 of sufficient length to engage wheels 8 or wheels 12 and having arms 19 adapted to enter holes 15 and arms 20 adapted to enter holes 15' are pivoted between wheels 8 and wheels 12.

Figure 3:
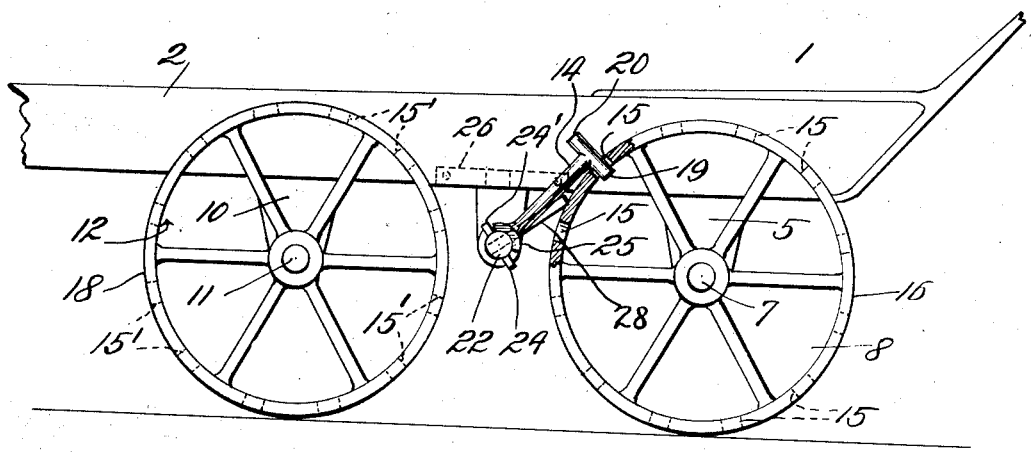
Fig. 3 is a fragmentary side view of the front end of the truck, showing the locking means.

In the preferred form of locking means shown in Fig. 3, shaft 22 having latches 14 mounted thereon is journalled in brackets 21 which are fixed to side rails 2 midway between wheels 8 and wheels 12. Fixed in shaft 22 near its ends are pins with projecting ends 24, 24' which hold the latches 14 in place. Latches 14 are provided with abutments 25 which are of a less width than the distance between ends 24, 24' and which are adapted to engage said ends, thus permitting latches 14 a limited amount of rotation about shaft 22.

Fixed in shaft 22 near one of side rails 2 and projecting at right angles to ends 24, 24' is pin 28. Attached to said side rail and adapted to engage said pin 28 is resilient plate 26 having a vertical groove 27. When wheels 8 and wheels 12 are required to rotate freely, pin 28 is raised to a vertical position where plate 26 engages said pin which is held between the edges of groove 27. The limitation on the rotation of latches 14 is such that, when pin 28 is in a vertical position, each of the respective latches is necessarily in a neutral position and is not in contact with either of its corresponding wheels. It is to be noted that, by pivoting latches 14 below side rails 2, said latches, when in a vertical position, do not project above the upper edge of frame 1.

When it is desirable to lock either of said pairs of wheels, the operator may push one of the latches 14 in the desired direction with the toe of his shoe. Before said latch has engaged its corresponding wheel, shaft 22 will be caused to rotate and this in turn will carry the other of said latches to a point where it will come into contact with its corresponding wheel, and, by permitting latches 14 some rotation about shaft 22, it is not necessary that the respective latches simultaneously enter a hole of and engage the corresponding wheels.

When the truck is propelled down a plane of such an inclination that it is desirable to apply continuous braking, each of the wheels 8 may be locked by latches 14 by engaging the respective arms 19 with one of the holes 15 in the rims 16 of the corresponding wheels.

When the inclination of the plane down which the truck is being propelled is such that intermittent braking is desired, wheels 12 may be locked by engaging ends 20 of latches 14 in holes 15'. In the normal operating position, the truck is freely rotated by means of wheels 8, and braking may be secured by lowering handles 3 until wheels 8 have been lifted from the floor, as above described, and the truck is slid along on locked wheels 8 and rests 9.

It is to be understood that the above detailed description is of a preferred form of my locking means and that the details of construction can be varied considerably without departing from my invention.

What is claimed is:

1. A hand truck having two side rails, each side rail having two longitudinally spaced wheels attached thereto, each of said wheels having holes in its outer rim, and locking means consisting of a latch pivoted between said wheels and having an arm adapted to enter said holes in the wheel in front of said latch and another arm adapted to enter said holes in the wheel behind said latch.

2. A hand truck having a frame, two longitudinally spaced pairs of wheels having holes in their outer rims, locking means for either of said pairs of wheels consisting of a shaft attached to said frame between said pairs of wheels, latches attached to said shaft near its ends having arms adapted to enter said holes in the corresponding wheels in front of said latches and arms adapted to enter said holes in the corresponding wheels behind said latches, and means for holding said latches in a neutral position.

3. A hand truck having a pair of wheels, and a positive lock for both of said wheels having a rotatable shaft, latches mounted for independent rotary movement about said shaft, and means for limiting the rotary movement with respect to the shaft of each of said latches.

4. A hand truck having a pair of wheels, a rotatable shaft, a latch mounted for rotary movement with respect to said shaft and adapted to lock one of the wheels, a second latch mounted for rotary movement with respect to said shaft and adapted to lock the other wheel, corresponding transverse pins fixed in and having their ends projecting from said shaft, and means for engaging each of the respective latches with the ends of the corresponding pin.

ARTHUR W. PARSONS.